Figure 8:
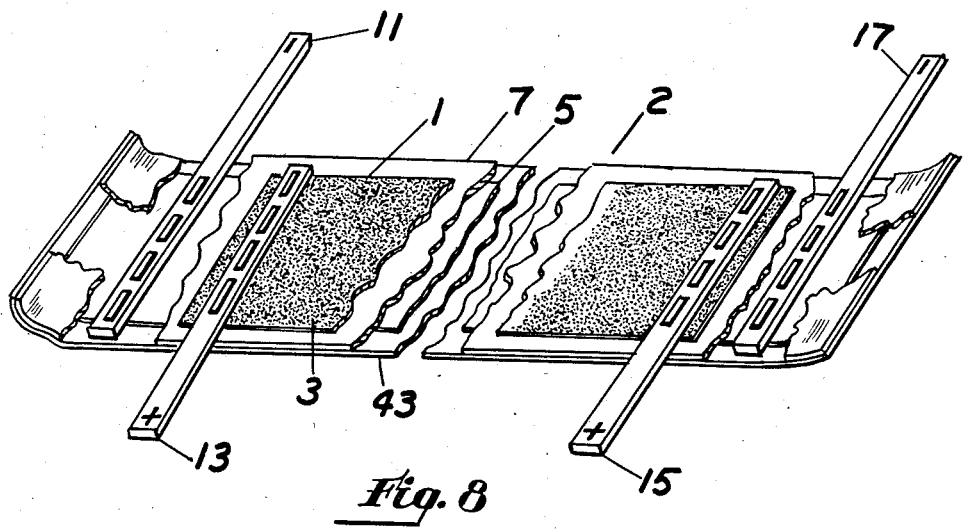

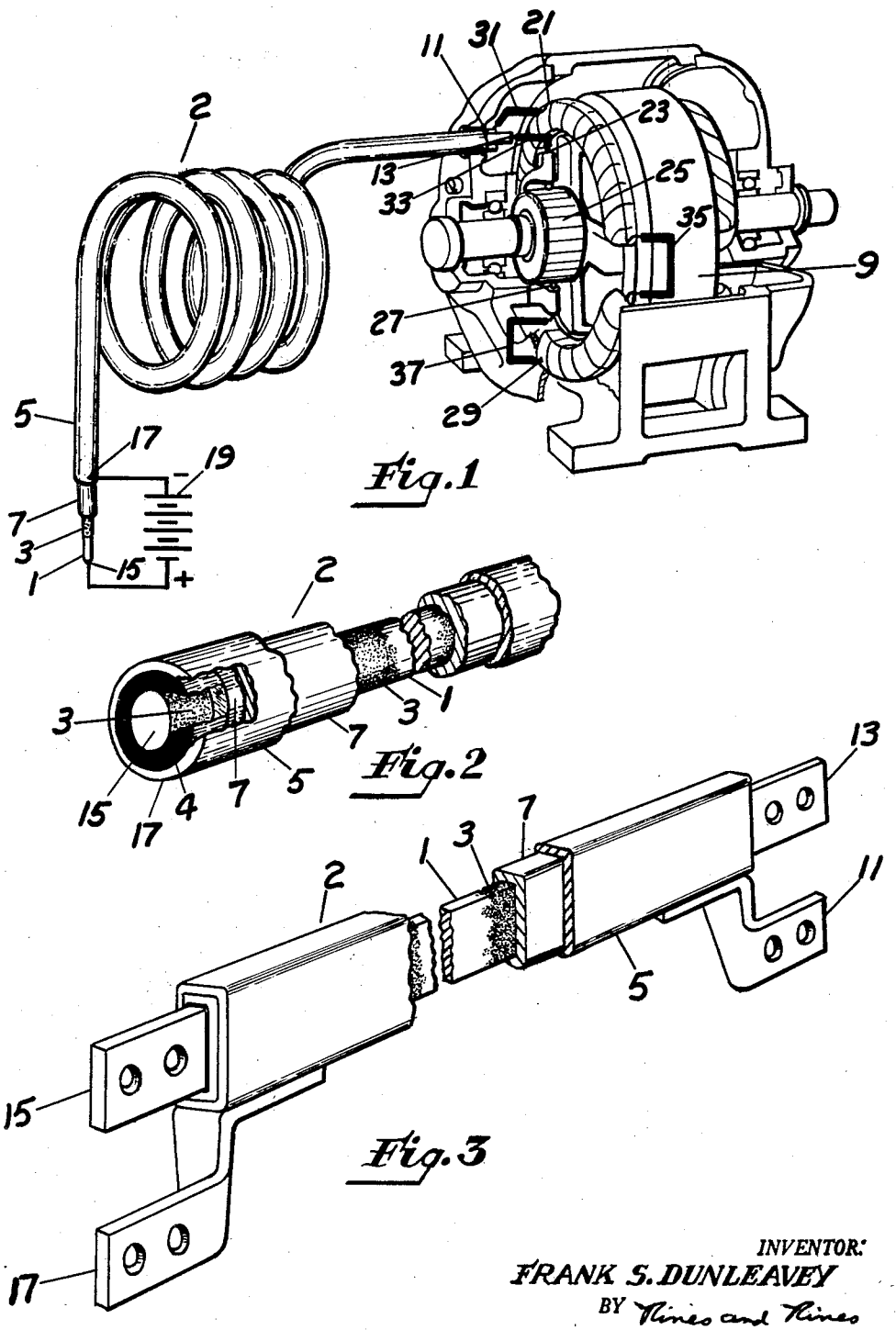

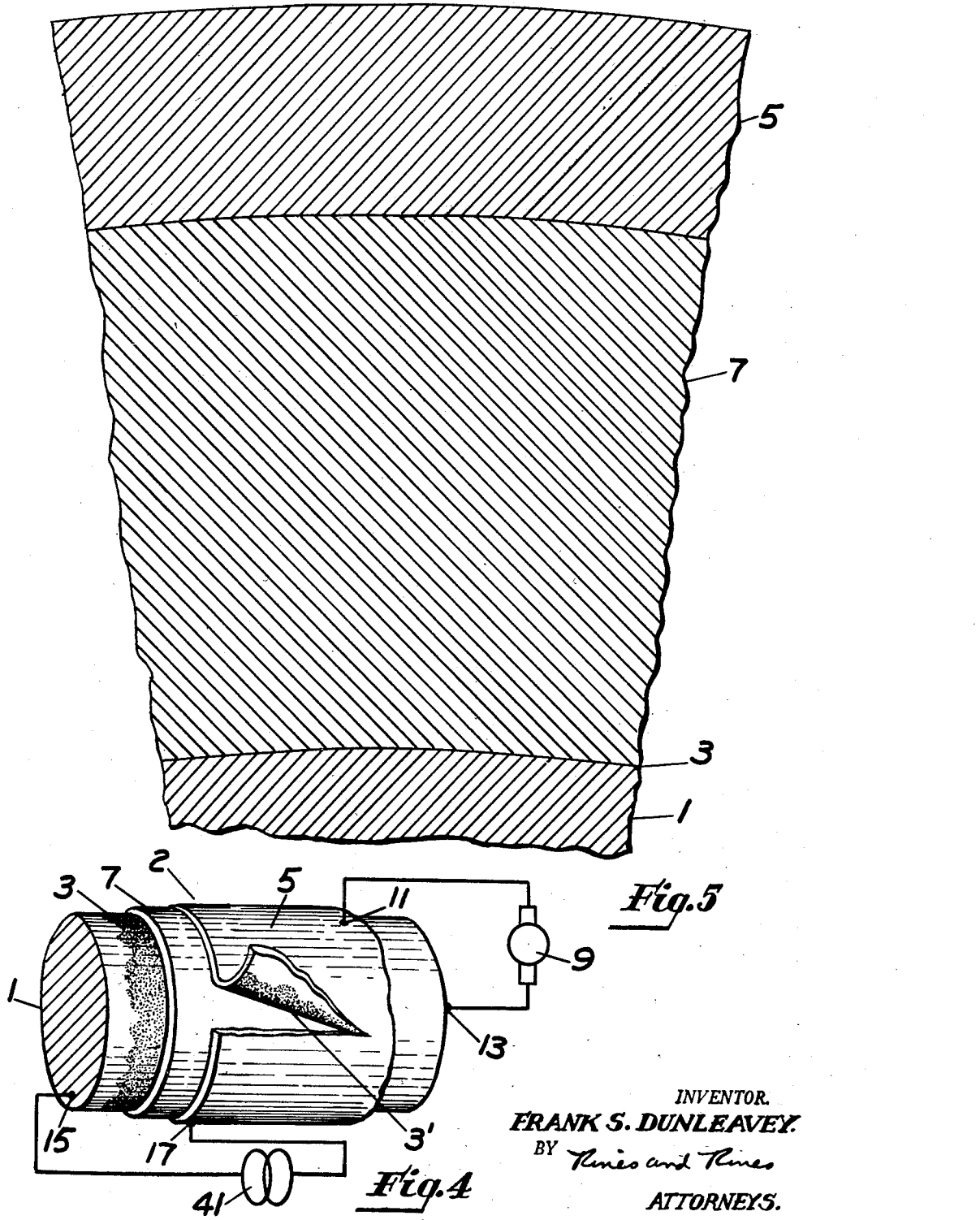

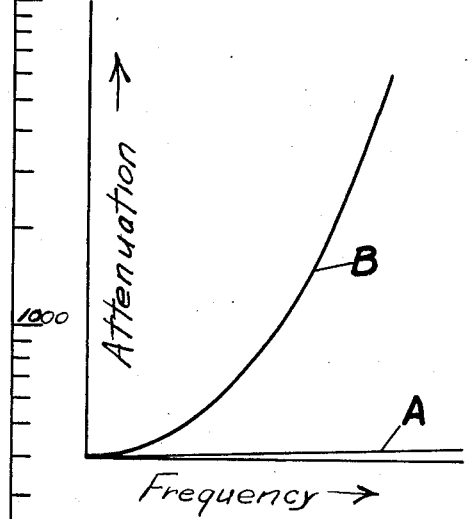

July 1, 1958     F. S. DUNLEAVEY     2,841,771
FOUR-TERMINAL FILTER EMBODYING AN IONIZED MEDIUM
Filed April 18, 1951     11 Sheets-Sheet 7

INVENTOR.
FRANK S. DUNLEAVEY
BY Rines and Rines
ATTORNEYS

July 1, 1958  F. S. DUNLEAVEY  2,841,771
FOUR-TERMINAL FILTER EMBODYING AN IONIZED MEDIUM
Filed April 18, 1951  11 Sheets-Sheet 8

INVENTOR.
FRANK S. DUNLEAVEY
BY
ATTORNEYS

July 1, 1958  F. S. DUNLEAVEY  2,841,771
FOUR-TERMINAL FILTER EMBODYING AN IONIZED MEDIUM
Filed April 18, 1951  11 Sheets-Sheet 10

INVENTOR.
FRANK S. DUNLEAVEY
BY *Rines and Rines*
ATTORNEYS

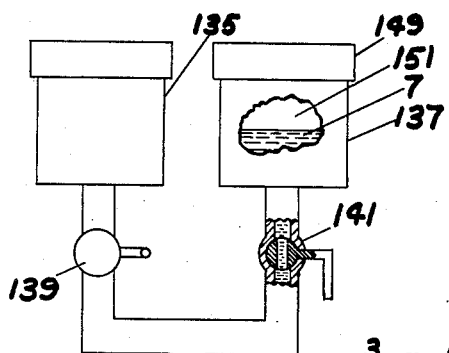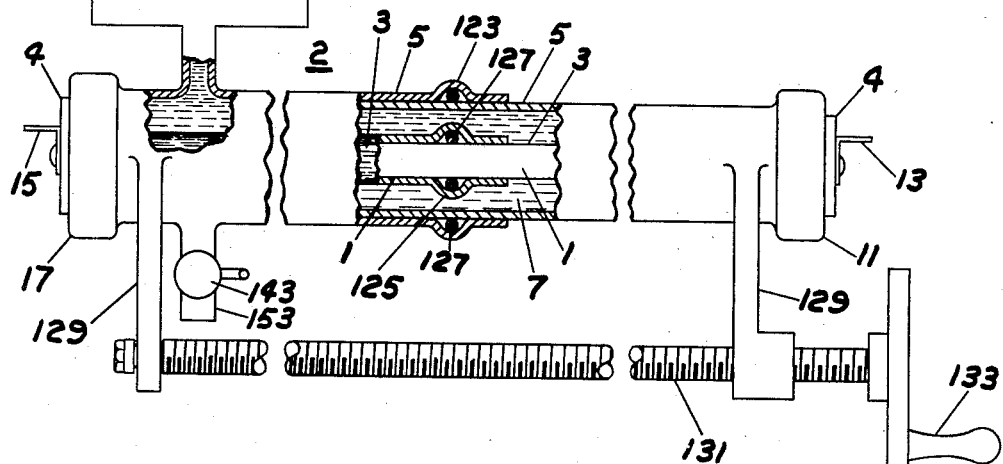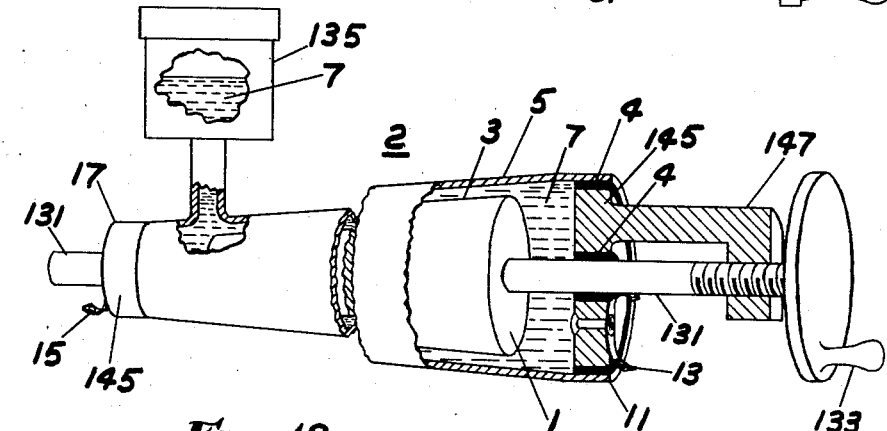

United States Patent Office 2,841,771
Patented July 1, 1958

2,841,771

FOUR-TERMINAL FILTER EMBODYING AN IONIZED MEDIUM

Frank S. Dunleavey, Canton, Mass.

Application April 18, 1951, Serial No. 221,625

17 Claims. (Cl. 333—79)

The present invention relates to electric-wave filtering apparatus and methods.

An object of the present invention is to provide a new and improved electric-wave filter adapted to attenuate radio-frequency energy over a large portion of the radio-frequency spectrum.

A further object is to provide an electric system embodying such a filter.

Another object is to provide a novel four-terminal filter embodying a conductive, ionized medium, such as an electrolyte or an ionized gas.

An additional object is to provide novel two-and-four-terminal coaxial electrode filters, the inner and outer electrodes of which are separated by a dielectric film and an electrolytic medium.

Still a further object is to provide a method and apparatus for maintaining substantially constant or for varying the attenuation characteristics of a filter of the character described.

Other and further objects will be hereinafter explained and more particularly pointed out in the appended claims.

In summary, the present invention relates to a filter comprising two conducting electrodes each having a surface disposed opposite to a surface of the other, the said surface of one electrode being provided with a thin dielectric layer, preferably an oxide film of the material of the said one electrode, a conducting ionized medium, preferably an electrolytic medium or an ionized gaseous medium, disposed with one of its surfaces in contact with the dielectric layer and its other surface in contact with the said surface of the other electrode, each electrode having two ends respectively disposed adjacent to the two ends of the other electrode, two of the adjacently disposed ends of the electrodes being respectively provided each with an input terminal, and the other two adjacently disposed ends being respectively provided each with an output terminal.

Novel two as well as four-terminal filters of this character, plane and curved electrode structures, including highly desirable coaxial electrode constructions, and methods and apparatus for temperature control and for varying the attenuation characteristics of the filters are hereinafter treated in detail, as are electric systems embodying the filters of the present invention.

Figure 9:
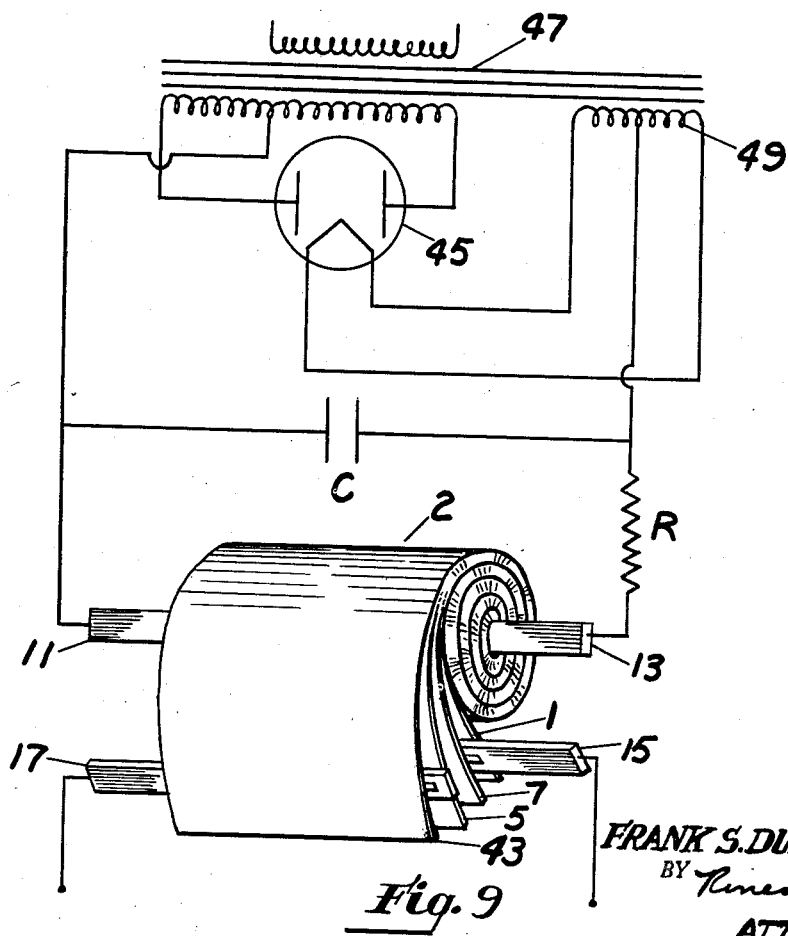
Figure 10:
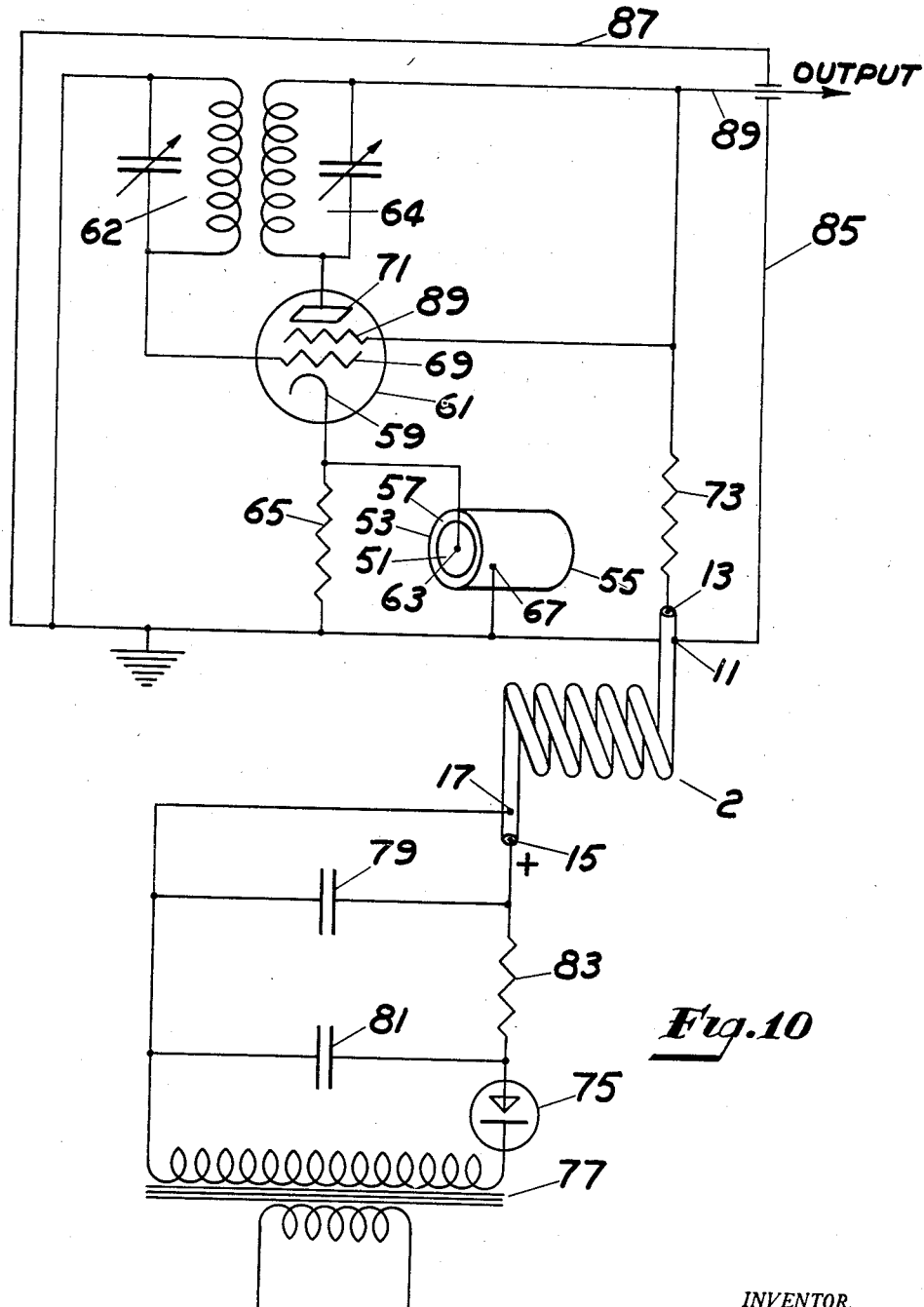
Figure 11:
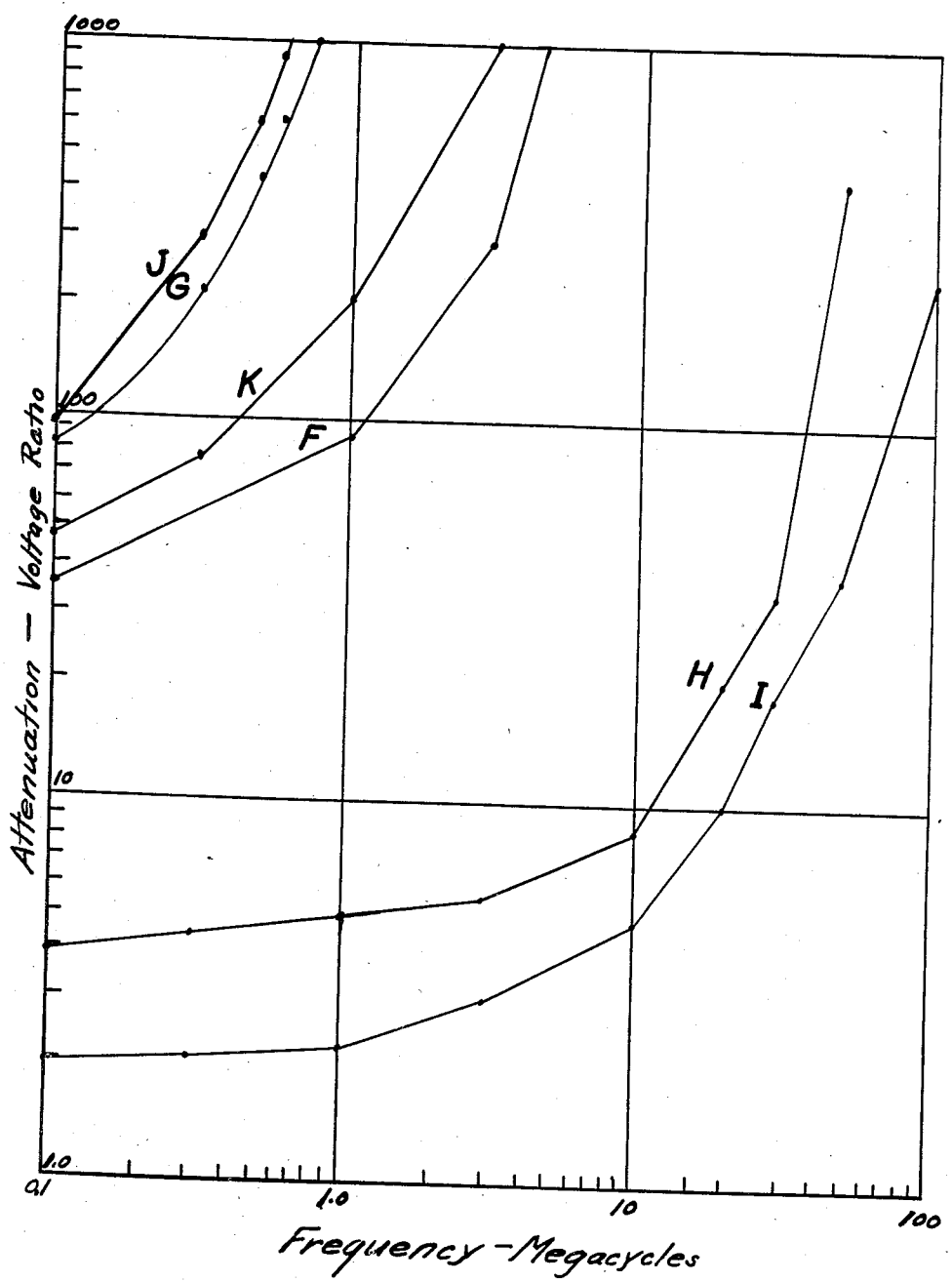
Figure 12:
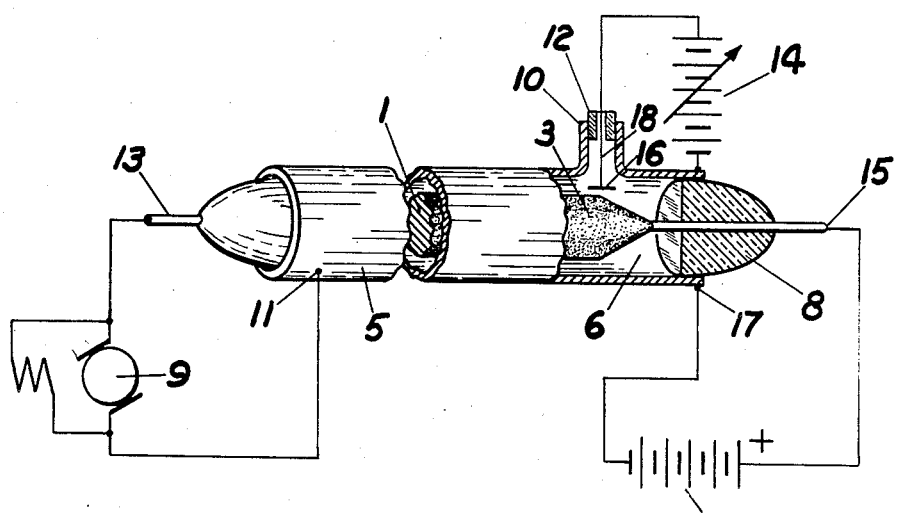
Figure 13:
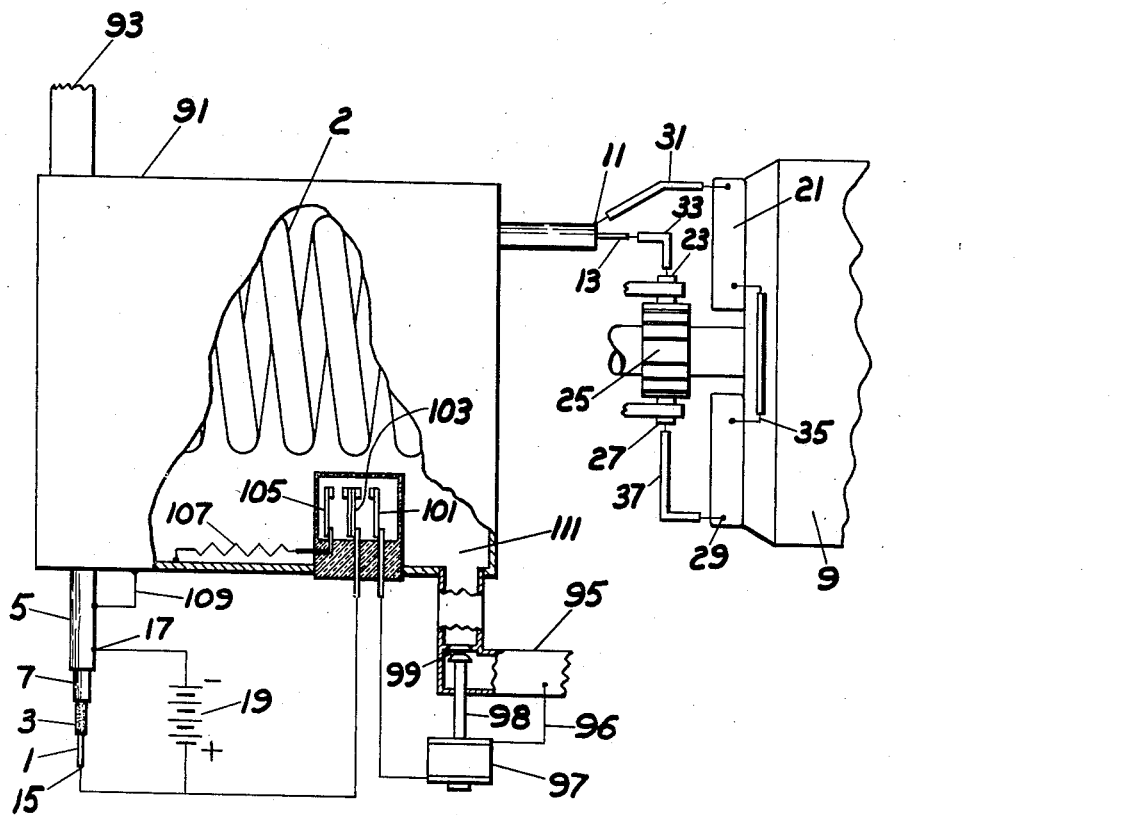
Figure 14:
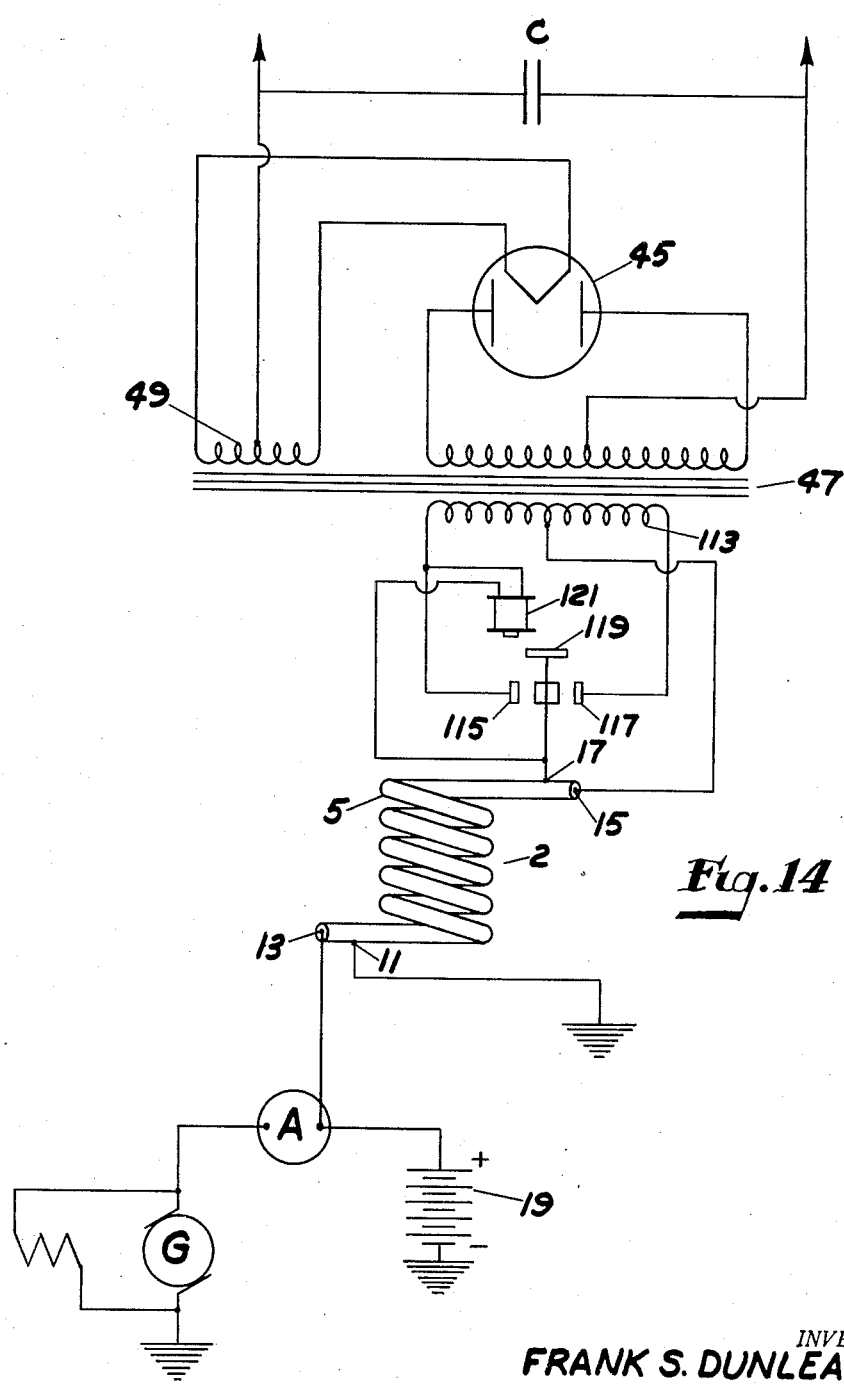
Figure 15:
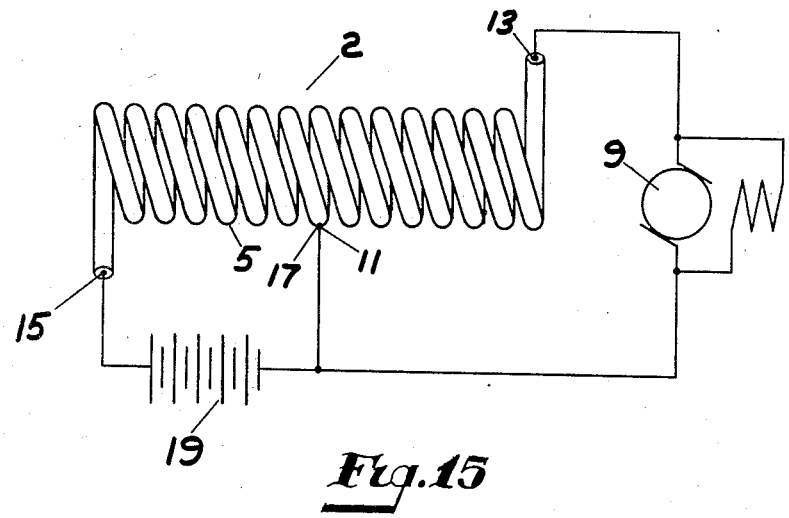
Figure 16:
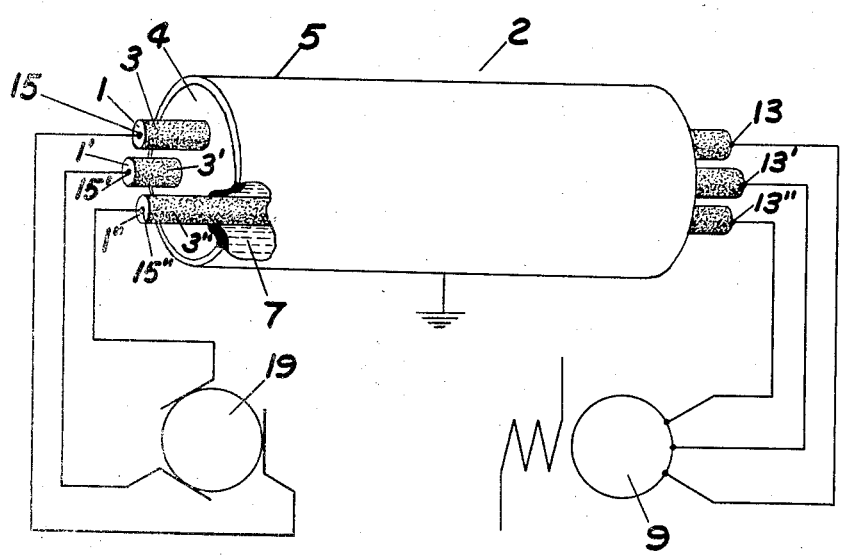

The invention will now be described in connection with the accompanying drawings, Fig. 1 of which is a perspective view, partly cut away, illustrating the connection of a four-terminal filter constructed in accordance with the present invention to a motor that generates undesired radio-frequency noise energy; Fig. 2 is a fragmentary perspective, upon an enlarged scale, of the filter of Fig. 1, partly cut away to illustrate details of the construction of the filter, though not drawn to scale; Fig. 3 is a similar view of a modified form of four-terminal filter adapted to carry high pulsating currents; Fig. 4 is a similar view of a modified filter adapted to operate with an alternating-current energizing source; Fig. 5 is a fragmentary transverse cross-sectional view of the filter of Figs. 1 and 2, drawn to scale, and illustrating a preferred relationship of the dimensions of the various parts; Fig. 6 is a graph comparing the attenuation characteristics as a function of frequency of an ordinary coaxial transmission line with the corresponding attenuation characteristics of a coaxial filter constructed in accordance with the present invention; Fig. 7 illustrates experimentally obtained graphs of the attenuation characteristics as a function of frequency of various filters of the type shown in Figs. 1 to 3; Fig. 8 is a perspective view, partly broken away, illustrating a modified four-terminal filter having substantially planar electrodes; Fig. 9 is a combined schematic circuit diagram and perspective view showing the filter of Fig. 8 in rolled form connected to operate in conjunction with a conventional low-frequency power-supply filter; Fig. 10 is a circuit diagram of a conventional oscillator or other high-frequency circuit and its power supply, illustrating the application thereto of a two-terminal and a four-terminal filter, constructed in accordance with the present invention; the experimentally obtained graphs of Fig. 11 illustrate the effect of temperature upon the attenuation characteristics of the filters of the present invention; Fig. 12 is a similar view of a further modified filter embodying a gaseous medium; Fig. 13 is a side elevation, partly cut away, illustrating a temperature-control system for the filter of Fig. 1; Fig. 14 is a circuit diagram illustrating the application of a filter of the present invention to a vibrator power supply; Fig. 15 is a similar view of a filter with modified terminals; Fig. 16 is a fragmentary perspective, partly broken away, of a modification embodying a plurality of inner electrodes; and Figs. 17 and 18 are similar fragmentary perspectives, partly broken away, illustrating filters of variable length and electrode separation, respectively.

Referring to Fig. 1, a filter 2 is illustrated connected to a direct-current motor 9 for the purpose of attenuating the wide band of radio-frequency energy inherently generated as noise energy during the operation of the motor. The filter 2 is shown comprising two cylindrical electrodes, an inner conductor or electrode 1, and a coaxially disposed outer conductor or electrode 5, circumscribing the inner electrode. At the left-hand end of the filter 2, the inner electrode 1 is shown provided with a terminal 15, and the outer electrode 5, with a terminal 17. Though the terminal 17 is shown spaced slightly above the terminal 15, this is only because the left-hand end of the filter has been stripped to illustrate various intermediate layers hereinafter discussed in detail, and it is to be understood that, in actual practice, the terminals 15 and 17 are preferably adjacently disposed. Two similar adjacent terminals are shown provided at the right-hand end of the filter 2. The right-hand end of the outer electrode 5 is provided with a terminal 11 and the adjacently disposed end of the inner electrode 1 is provided with a terminal 13.

The terminals 11 and 13 are shown connected to the motor 9 in a circuit that will subsequently be explained. For present purposes, it suffices to state that by means of this connection, the wide band of radio-frequency signals generated by the motor are impressed upon or fed into the filter 2. The terminals 11 and 13 may thus be termed the input terminals of the filter. The terminals 15 and 17 may correspondingly be termed the filter output terminals.

Considering, for the moment, the construction of the filter 2 as merely that of a conventional coaxial transmission line, it is quite apparent that the line would be an excellent conductor of radio-frequency energy. Referring, for example, to Fig. 6, the degree of attenuation of the coaxial line is plotted along the ordinate as a function of frequency plotted along the abscissa. The attenuation characteristic represented by curve A of Fig. 6 illustrates that even if the frequency fed into the line is increased over a wide range, the line would produce but very little attenuation. Stated in other terms, the line 2 would pass a wide band of radio frequencies with small attenuation.

The applicant has discovered, however, that if certain modifications are made to the line 2, its properties become markedly and unexpectedly changed. By means of these modifications, indeed, the coaxial line 2 no longer remains an excellent transmission line, but, on the contrary, becomes just the opposite, namely, an excellent filter or attenuator of radio-frequency energy. Instead of passing a wide band of radio frequencies with little attenuation, as shown in the curve A of Fig. 6, the modified device attenuates radio frequencies as shown in the curve B, with markedly increasing attenuation for increasing frequencies. Not even lossy lines have such attenuation characteristics.

It is in order, therefore, to examine what modifications are necessary to be applied to the line 2 in order so surprisingly to change its properties from those of a conventional transmission line to those of a most unusual wide-band filter or attenuator.

Referring once again to Fig. 1, the inner electrode 1 of the coaxial device 2 is shown at the stripped left-hand end, provided with a very thin dielectric or insulating film or layer 3, more clearly illustrated in Fig. 2, that covers the entire outer surface of the inner electrode 1. The inner electrode 1 is preferably constituted of a film-forming metal such as aluminum, upon the surface of which a thin dielectric layer of aluminum oxide 3 may be formed by techniques hereinafter discussed. An electrolytic medium 7 comprising an ionized solution, preferably impregnated in a carrier or spacer material, as later treated in detail, is shown disposed with its lower surface contacting the thin dielectric layer 3, and its upper surface contacting the inner surface of the outer electrode 5 of the device 2. The device 2 has thus become modified from conventional transmission-line construction by the insertion of a dielectric layer 3 and an electrolytic conducting layer 7 between the inner conductor 1 and the outer conductor 5. It is this construction that so startlingly changes the transmission-line properties of the device 2 and converts it into the very antithesis of a transmission line, namely, into a wide-band attenuator or filter.

In the application to a direct-current motor 9, previously mentioned in connection with Fig. 1, the filter 2 has been found effectively to attenuate the complete wide band of radio-frequency by-products of the operation of the motor 9. Such motors are known to generate radio-frequency noise energy ranging in frequency from a fraction of a megacycle up to hundreds of megacycles, and beyond. These generated frequencies are very undesirable, particularly where they are radiated by the motor in the neighborhood of radio-frequency communication or other apparatus with which they interfere. It has heretofore been an extremely difficult problem to design filter networks in accordance with conventional techniques to eliminate such a wide band of radio frequencies. The impracticability of employing a plurality of such filter networks to cover various successive frequency ranges in such a wide band of frequencies, because of size and expense, has left this problem largely without solution. The remarkably simple, relatively inexpensive and compact filter or attenuator of the present invention, on the other hand, provides a complete and satisfactory solution to this difficult problem of wide-band filtering.

Though the discussion has so far been limited to undesired frequencies generated by a direct-current motor, it is to be understood, of course, that this is by way of illustration only. The filter 2 may be employed with any other type of generator of low, medium or high-frequency energy to attenuate wide bands of frequencies, or, for that matter, limited frequency bands. By way of further example, high-frequency energy generated in a tuned oscillating or amplifying circuit, as later discussed in connection with Fig. 10, may be attenuated by the filter 2. As still another example, the filter 2 may be employed in electronic or other power-supply circuits, as hereinafter explained in connection with Figs. 9 and 14. It is convenient, however, in order to explain with simplicity the invention and its performance, to continue at this point with the illustrative system of Fig. 1 embodying the motor 9.

A preferred manner of feeding the wide-band high-frequency energy generated by the motor 9 into the filter 2 is illustrated in Figs. 1 and 13. The input terminal 11 of the outer conductor 5 is connected by a conductor 31 to the upper field winding 21 of the motor 9. One end of the field winding 21 is connected by a conductor 35 to one end of the lower field winding 29 of the motor 9. A conductor 37 is connected at an intermediate point of the lower field winding 29 to the lower motor brush 27, and through the armature 25 to the upper brush 23. The upper brush 23 is, in turn, connected by a conductor 33 to the input terminal 13 of the inner electrode 1. The outer electrode 5 of the filter 2 is preferably maintained at the same potential as the casing of the motor 9, as by a bond, not shown. To energize the field windings of the motor, a direct-current power-supply source, shown as a battery 19, is employed with, for example, the positive side of the battery 19 connected to the left-hand terminal 15 of the inner electrode 1, and the negative terminal, connected to the corresponding terminal 17 of the outer electrode 5. The system becomes thus energized along the circuit traceable from the negative terminal of the battery 19 to the terminal 17 of the outer electrode 5 of the filter 2; then, along the outer electrode 5 to its input terminal 11; along the conductor 31 to the winding 21; through the winding 21 and the conductor 35 to the lower winding 29; through the conductor 37 to the bottom brush 27; then, through the armature 25, the top brush 23 and the conductor 33 to the input terminal 13 of the inner electrode 1; then, back along the inner conductor 1 to its left-hand terminal 15; and, finally, to the positive side of the battery 19.

When the motor 9 is operated with the filter 2 connected between the motor and the power supply 19, successful attenuation of all of the disturbing frequencies generated by the motor has been found to be effected. In one series of tests, as an illustration, a conventional aircraft-type direct-current, 28-volt, reversible motor 9 was employed. This type of motor produces undesirable radio-frequency noise energy of considerable amplitude over a wide frequency band ranging from about 0.16 megacycle up to about 2000 megacycles. The filter 2 was constructed in accordance with a preferred embodiment of the present invention, comprising an aluminum-wire inner electrode 1 of about 0.050 inch in diameter, formed with a 36-volt aluminum oxide dielectric film 3, as later discussed, and covered by a pure cotton sleeve spacer 7 impregnated with a film-forming conducting electrolyte comprising an aqueous solution of ethylene glycol and ammonium borate, and a copper-tube outer conductor 5 the inner surface of which was contiguous with the electrolyte-impregnated sleeve or spacer 7 and of about 0.120 inch in outside diameter, the filter having an overall length of about twelve feet. When the motor was operated without the filter 2, from 100,000 to 250,000 microvolts of radio-frequency energy was measured at the various generated frequencies across the brushes 23, 27. With the filter connected as above described, however, all of the generated frequencies were markedly attenuated, the attenuation increasing rapidly with increasing frequency. In Table I, below, the column headed "Amplitude Measured At Output Terminals" refers to the amplitude of the energy of the various frequencies appearing at the output terminals 15, 17 of the filter 2. The column headed "Amplitude Measured With Radiation Pick-up Loop" refers to the amplitude of energy that could be picked up in the neighborhood of the motor with a pick-up loop. The notation "BG" in the table means back-ground or threshold noise level of the receiver used as the detecting device, indicating no detectable amplitude.

TABLE I

*Measurements on D. C. aircraft motor with coaxial electrolytic filter*

| Generated Undesired Frequencies (Megacycles per Second) | Amplitude Measured at Output Terminals (Microvolts) | Amplitude Measured With Radiation Pick-up Loop (Microvolts) |
| --- | --- | --- |
| 0.16 | 200 | 15 |
| 0.32 | 125 | 23 |
| 0.55 | 45 | 11 |
| 1.10 | 27 | 8 |
| 1.80 | 10 | 4 |
| 3.2 | 7 | 3.5 |
| 7 | 6 | 1.0 |
| 10 | 4 | BG |
| 20 | BG | BG |
| 30 | BG | BG |
| 50 | BG | BG |
| 75 | BG | BG |
| 100 | BG | BG |
| 150 | BG | BG |
| 975 | BG | BG |
| 2,000 | BG | BG |

As further examples of the attenuation characteristics of coaxial filters of the character described, reference is made to the experimentally obtained graphs of Fig. 7. The attenuation was measured for various diameters and lengths of coaxial filters 2 by feeding radio-frequency energy of known amplitude into the filter 2 between the input terminals 11 and 13, and measuring the voltage in a receiver connected between the output terminals 15 and 17. The ratio of the radio-frequency voltage input to the voltage output is a measure of the attenuation produced by the filter 2, and is plotted along the ordinate in logarithmic units. The frequency of the input voltage signals to the filter 2 is plotted along the abscissa, also in logarithmic units of megacycles.

Curve C of Fig. 7 illustrates the attenuation characteristic as a function of frequency of a coaxial filter 2 having a 99.8 percent pure aluminum wire inner electrode 1 of approximately 0.125 inch outside diameter and a copper outer electrode 5 approximately 0.444 inch inside diameter and approximately 0.062 inch thick. The inner and outer electrodes were about twelve feet long. The electrolytic medium 7 comprised pure cotton sleeving impregnated with a liquid-conducting electrolyte. This electrolyte was made by first heating to a temperature of 123 degrees centigrade 160 milliliters of ethylene glycol, 215 grams of boric acid, and 50 milliliters of 28 percent aqua ammonia. The cotton sleeving spacing means was impregnated with this composition at a temperature of 110 degrees. The aluminum electrode 1 was provided with a dielectric oxide layer 3 of thickness of the order of probably a millionth of an inch, formed thereon by subjecting the electrode to a 36-volt film-forming voltage in an oxide-producing bath in the conventional manner employed in the electrolytic condenser art. It will be observed that the ratio of the outer diameter to the inner diameter of this particular filter 2 is approximately 3.55 which is very near the conventional ratio commonly employed for coaxial transmission lines. Such lines are, of course, in every-day use for the purpose of transmitting, with little attenuation, frequencies of the order of magnitude with which this discussion is concerned, in the manner shown in curve A of Fig. 6. The characteristic illustrated in curve C demonstrates how remarkably the properties of the device, when rebuilt along the lines above described, are changed to convert the line from an efficient transmitter to an extremely efficient attenuator.

It has been found that the closer that the inner surface of the outer electrode 5 can be placed to the outer surface of the inner electrode 1, the more efficient the filter becomes for purposes of attenuation. At any given frequency, for example, there will be greater attenuation the more nearly equal the inner diameter of the outer electrode and the outer diameter of the inner electrode. A system for changing the electrode spacing during operation of the filter is later discussed in connection with Fig. 18. If, for example, the diameter of the inner surface of the outer electrode be designated by $d_1$, and the outer diameter of the inner electrode be designated by $d_2$, the filter has been found to become more and more efficient as $d_1 - d_2$ approaches zero and $d_1/d_2$ approaches unity. An example of this phenomenon is illustrated in curve D of Fig. 7. This data was obtained under similar circumstances to the measurements of the attenuation characteristics of the filter previously described in connection with curve C. The filter, the performance of which is represented by curve D, however, had a ratio of $d_1/d_2$ of about 1.5, about two-fifths that of the filter the performance of which is presented in curve C. The inner electrode 1 of this second filter was also made of 99.8 percent pure aluminum wire approximately 0.125 inch in diameter and provided with an oxide film formed at 36 volts. A hollow copper outer conductor of about 0.187 inch in diameter was employed as was an electrolytic medium 7 of the same character before described. This filter was also about 12 feet long. Its performance was markedly better from the point of view of an attenuator than the performance shown in curve C. For any given frequency, such as, for example, 10 megacycles, the first filter, as shown in curve C, attenuated the 10-megacycle signals with an attenuation of about 6. The second filter, as illustrated in curve D, however, attenuated the same signal with an attenuation of about 25. Similarly, at 70 megacycles, the second filter out-performed the first by the ratio of about 2500 to 100. In general, therefore, for optimum operating results, the smaller the separation of the inner and outer electrodes, or, the smaller the dimensions of the electrolytic medium 7, the better the performance of the filter as an attenuator. Electrode separations of the order of thousandths of an inch are very desirable.

It has also been found, furthermore, that under some circumstances, the longer the length of the filter, the better its attenuating characteristics. In curve E of Fig. 7, for example, two identical filters of the type before described in connection with the characteristic of curve D were connected in series, effectively to produce a 24-foot filter. The improved attenuation characteristics over those illustrated in curve D are quite evident. As an illustration, at 10 megacycles, the longer filter out-performed the shorter filter by the ratio of about 400 to 25. A system for changing the length of a filter during its use is later treated in connection with the system of Fig. 18.

The attenuating characteristics illustrated in Fig. 7 were obtained by connecting conventional laboratory signal generators to the filter input terminals and measuring across a load at the filter output terminals the resulting voltages. In order to obtain correct absolute attenuation values, it is necessary that the generator be matched to the load which it is driving. Since the filters of the present invention are themselves of low impedance, of the order of an ohm or less, it is desirable, therefore, that a matching network be inserted between the generator and the filter such that, irrespective of the presence of the low impedance of the filter, the generator works into a load impedance that closely approximates its own internal impedance. While present-day signal generators have internal impedances of the order of 20 to 50 ohms, the lowest value radio-frequency load resistor that is commercially available is of the order of one ohm. It becomes necessary, therefore, to drive the filter from a generator of effective internal impedance of approximately one ohm. The measurements plotted in Fig. 7 represent attenuation measurements obtained with such a one-ohm generator. The results so obtained, however, are not truly representative, from absolute value considerations, of the attenuating properties of the filter, since the actual impedance of high-frequency generators with which the filter is, in practice, to be employed are of the order of 100 to 10,000 ohms. At both low and high frequencies, therefore, the filter will actually, in practice, attenuate considerably more than is indicated in Fig. 7. That this is true may be seen from a comparison of Table I with curve D of Fig. 7, Table I representing the output voltage obtained with a practical direct-current motor as the high-frequency generator. Until the day arrives that variable high internal-impedance signal generators are produced, therefore, the best method of determining the attenuating properties of the filters of the present invention is to measure the attenuation produced when connected to the different sources of radio-frequency noise or other voltages with which it is to be employed.

While the constructional details of several filters have been described, little has been previously said with regard to the method of building or assembling the filters. The coaxial filters of the present invention may, in fact, be constructed in any one of a number of ways. A preferred method of construction is as follows. An aluminum wire inner electrode 1 is first cleaned with 4 percent aqueous solution of sodium hydroxide at about 60 degrees centigrade for about 30 seconds. The wire may then be immersed for about one minutes in 5 percent aqueous solution of nitric acid at about 90 degrees centigrade. The inner conductor 1 is then rinsed in distilled water and dried. It may then be passed through an aqueous film-forming solution, such as 2.5 grams per liter of sodium borate and about 86 grams of boric acid per liter heated to a temperature of about 95 degrees centigrade. The forming voltage for the electrolytic film is then applied between a copper negative electrode and the aluminum wire for one to two minutes. The wire 1 will thus form a dielectric oxide film or layer 3 having rectifying characteristics that permit the conducting of appreciable current in one direction across the film or layer but prevent appreciable conduction in the opposite direction. The film or layer 3 is then permitted to dry. The magnitude of the voltage determines the thickness of the film or layer and thus the subsequent operating voltages with which the electrode may be used. Such electrodes that form their own oxide layers are known in the art, accordingly, by the term "film-forming" electrodes, previously employed, of which aluminum, magnesium, zinc and tantalum are but a few examples. Cotton sleeving, prepared pure by washing in distilled water and drying, may then be applied about the wire 1. The wire may, for example, be drawn through the sleeving, or the sleeving may be wound or braided about the wire as with the aid of conventional braiding machines. The cotton-sleeved wire may then be drawn through the outer tubular electrode 5. If desired, as for purposes of saving space, the filter 2 may then be coiled as shown, for example, in Fig. 1. The whole assembly may then be immersed in hot electrolyte solution of the character before described at a temperature of about 110 degrees centigrade for approximately half an hour or until all air bubbles cease, indicating the complete saturation of the cotton sleeve with electrolyte. The sleeving could, of course, be impregnated after its application to the inner electrode 1 and before assembly in the outer electrode 5, but this procedure renders it rather difficult to prevent contamination during assembly. The filter assembly 2 may then be aged by cooling it to approximately 85 degrees centigrade and applying between the inner and outer electrodes a lower potential than the film-forming potential. If, as before stated, the oxide film or layer 3 is formed at 36 volts, the aging potential may be 32 volts. This procedure repairs any cracks in the film or layer 3 that may have formed. Terminals and end seals may then be connected to the ends of the filter in any conventional manner. Since the liquid electrolyte is present in the medium 7, it is preferable that hermetic seals be employed to prevent leakage and atmospheric contamination. A rubber seal of this character, for example, is shown in Fig. 2 at 4, sealing the space between the inner and outer electrodes 1 and 5 at the left-hand end of the filter. Other types of fittings or seals may, of course, also be used such as automotive-type S. A. E. fittings presently employed for oil lines. Terminal lugs may be applied to the electrodes at their ends, or leads may be connected directly to the terminals. Conventional coaxial-line terminal fittings, moreover, such as the Army-Navy type end-connector may be attached at the ends of the filter as is well known in the art. The showing is Fig. 1 of the terminals 11, 13, 15 and 17, indeed, is purely schematic in order not to complicate the drawings with old details, for these terminals may comprise any type of connector. To manufacture the filter, furthermore, a combination of already well-known automatic machinery may be employed to feed the wire inner conductor through a forming bath, to cover the wire with cotton, to pass the cotton-covered wire through an electrolytic bath to impregnate the cotton, and to braid a metallic outer conductor out of fine wires. The assembly may then be covered with an extruded plastic leak-proof cover or seal. This procedure would produce a flexible filter suitable for use as a line-cord type of filter for connection to convenient power outlets. A cheaper and less effective filter may be constructed, also, by winding the inner film-formed electrode in the form of a solenoid, either in single or multiple layers, and inserting the electrode in a metallic can, perhaps of the type later discussed in connection with Fig. 13, which may be filled with electrolyte and sealed.

It is not necessary, of course, that cotton sleeving be used, for any other spacing material that may become impregnated with the electrolyte to form an electrolytic medium 7 may also be employed. Cotton thread is, however, easy to use and has proved quite satisfactory. Paper, fibers and other types of fabrics, for example, are among other materials that could be substituted for the cotton sleeve. It has been found, indeed, that if paper is beaten into a pulp in the electrolyte and the wire electrode is drawn through the electrolyte, being rotated while it is so drawn, that electrolyte-impregnated paper fibers will adhere to the electrode surface. It is to be understood, furthermore, that the electrolytic medium 7 is by no means restricted to a material impregnated with electrolyte. The spacer material 7, indeed, may be directly sprayed upon the electrodes. Since the filters are sealed at the ends, the medium 7 may constitute the liquid or gelatinous electrolyte alone. The outer electrode serves as a containing wall for the electrolyte as well as serving other important functions later explained.

The invention is not limited, moreover, to oxide films or to the particular electrolytic media before described. Any thin dielectric film 3 may be employed, though it is probably most effective and least costly to employ a film-forming electrode. All types of electrolyte solutions, moreover, may be employed, and, as will later be pointed out in connection with Fig. 12, other types of ionized media 7 may be used besides electrolytes. If electrolytic media are employed, however, it is preferable that they be of the film-forming type; that is, that they support and do not attack the electrodes or the film. Electrolytes that are not film-forming may, however, be employed with particular metal electrodes, or they may even be permitted to attack the electrodes or their films if operation over a short period of time only is required. A list of very desirable film-forming electrolytes, particularly adapted to the purposes of the present invention, follows. This list is by no means exhaustive, but it is illustrative of perhaps the preferred electrolytes.

Ethylene glycol—borax ($Na_2B_4O_7$)—water
Etheylene glycol—ammonium acid borate—water
Glycerine—borax—water
Polyethylene glycol—borax—water
Polyethylene glycol—ammonium acid borate
Borax—boric acid—water
Boric, phosphoric, acetic, chromic, oxalic, lactic, citric or tartaric acids and water, or the ammonium, sodium and potassium salts thereof.

Thus far, only cylindrical coaxial electrodes have been discussed. It is not essential to the present invention, however, though it is preferable, that the inner and outer conductors have even the same shape, or that the shape be that of a circular cylinder as shown in Figs. 1 and 2. The filter 2 of Fig. 3, for example, is constituted of a rectangular bus-bar type of inner electrode 1 provided with its dielectric layer or coating 3, a correspondingly shaped spacer or covering comprising a conducting ionized electrolytic medium 7, and a hollow rectangular outer conductor 5. This particular construction is well adapted for applications where high-power currents are to pass through the filter 2. The input terminals 11 and 13, which may comprise extensions of the inner electrode 1, and the output terminals 15 and 17 secured to the outer surface of the outer electrode 5, therefore, are shown as sturdy metal strips provided with apertures for receiving securing means, such as screws.

While, moreover, the energizing voltage or power-supply source applied to electric systems embodying the filter 2, such as the source 19 of Fig. 1, has previously been described as a source of direct-current voltage, the filter may also be adapted for operation with low-frequency alternating-current energizing voltages. To this end, it is desirable that the outer conductor or electrode 5 be also of the film-forming type, and that its inner surface be provided with a rectifying dielectric film or layer such as the layer 3' shown in Fig. 4. The outer conductor 5 may be constructed, for example, of aluminum, and the insulating layer 3' may be a formed rectifying aluminum oxide layer. In Fig. 4, as in Fig. 1, the ends of the filter are shown peeled or skinned back to illustrate the dielectric layer, and the electrolytic medium 7.

An alternating-current energizing generator 41 is shown connected between the output terminals 15 and 17 of the filter 2, and the source of radio-frequency or other high-frequency disturbances, such as the motor 9, is shown connected between the input terminals 11 and 13. It is to be understood that though the length of the filter 2 as shown in Fig. 4 is quite short, this is only for illustrative purposes and it may, if desired, be very long so as to take advantage of the previously discussed improved attenuation characteristics of long filters.

It is also to be understood that the showing in Figs. 1 to 4 have all been schematic in order more clearly to illustrate the construction. The sectional view of Fig. 5, however, is drawn to a scale of about 200 to 1, illustrating particular relative proportions. The inner conductor 1 is shown provided with an extremely thin oxide or other insulating layer 3 which is contiguous with an electrolytic medium 7 that, in turn, fills the space between the outer surface of the inner conductor 1 and the oppositely disposed inner surface of the outer conductor 5. The thickness of the outer conductor 5 may, for example, be ten thousandths of an inch, and the thickness of the electrolytic medium 7 may be about two-hundred fifty ten-thousandths of an inch. Thinner electrolytic media may, of course, be employed for greater attenuating results, as previously described.

The present invention is not dependent upon the existence or non-existence of theories, whether accurate or inaccurate, to explain its operation. It is sufficient to describe the invention as it has been found to work in practice. The following may, however, be an explanation of the operation of the filters of the present invention. At high frequencies, current flows along the skin or surface of a conductor. High frequency current will thus flow in one direction down the outside surface of the inner electrode 1 along the inner or lower face of the thin dielectric layer 3. Return current would normally flow along the oppositely disposed inner surface of the outer electrode 5 were it not for the presence of the conducting electrolytic or other ionized medium 7 between the inner surface of the outer conductor 5 and the layer 3. With the electrolytic medium providing an effective conducting extension from the inner surface of the outer electrode to the outer or upper surface of the layer 3, it would appear that the high-frequency return current would be confined to a path of least impedance down the lower surface of the electrolytic medium 7 contiguous with the upper surface of the layer 3. Current therefore appears to flow in one direction along one surface of the very thin dielectric layer 3 and back along the other surface of the dielectric layer 3. Each and every portion of the thin dielectric layer 3 would appear, therefore, to be employed, presumably accounting for the high attenuating properties of the filter. By virtue of the fact, moreover, that the two opposite directions of current flow occur in paths separated by the extremely thin dielectric layer 3, the electromagnetic fields of the currents would appear to cancel each other. Since electrostatic fields can not exist outside the outer shielding electrode 5, and since no resultant external magnetic field has been shown to exist, the filter should radiate no energy, thus further performing the function desired. Since nothing in this explanation has limited the direction of current flow along either electrode, the filter, moreover, may be interchangeably used with either pair of end terminals as the input or the output terminals. This, furthermore, has been verified by experimentation.

It is remarkable, moreover, that the four-terminal filter of the present invention is endowed with nearly all the desirable attributes of an ideal filter that have heretofore been unrealizable in practice. Inductive effects including resonance characteristics and sensitivity to load impedances with consequent impedance-matching problems are virtually eliminated; shunt losses appear to be maximized; the disturbances are caused to travel successively along each unit section of the network, insuring the employment of each portion of the thin dielectric layer 3; the capacitance per unit section of the filter appears to approach a maximum as $d_1/d_2$ approaches unity; and electrostatic shielding without effective added inductance is provided.

While, as before mentioned, briefly, the shapes of the inner and outer electrodes may be of any desired character, it is preferable that the outer electrode be curved so as completely to enclose or circumscribe the inner electrode. This is preferred for several reasons. In the first place, each unit length or section of the filter is then identical and unaffected by inductive or other effects caused by the physical presence of adjacent sections. Secondly, the system is completely shielded, as above discussed, thereby preventing any radiation from the filter itself. Thirdly, the circumscription prevents contamination of the electrolytic medium. If, however, these features are not particularly desired to a great degree, from the broadest concept of the present invention, it is desirable only that the outer conductor have a surface covering at least part of an oppositely disposed surface of the inner electrode. If, however, such electrodes are placed in further shields or cans, as before mentioned, better shielding results are obtainable. As an illustration, the filter may be assembled in the same manner that many present-day electrolytic condensers are assembled, but, of course, employing four end terminals, two input and two output terminals, instead of the conventional two central terminals of a condenser. In Fig. 8, for example, a flat planar inner electrode 1 may be film-formed on both sides to provide an oxide layer 3. At the left-hand end of the electrode 1 an input terminal 13 may be applied in the form of, for example, an aluminum strip secured to the electrode by aperture punching, as is well known in the art. At the right-hand end of the same electrode 1, a similar output terminal 15 is provided. Adjacent the bottom oxide-coated surface of the inner electrode 1 is an electrolytic medium 7, as of paper, impregnated with a conducting electrolyte. Contiguous with the bottom surface of the electrolytic medium 7 is the inner planar surface of an outer electrode 5, also preferably of film-forming material. To the left-hand end of the inner surface of the outer electrode 5 an input terminal 11 of the same character as the terminal strips 13 and 15 is provided, and a similar output terminal 17 is connected at the other end of the electrode 5. This four-terminal construction represents a marked departure from conventional condenser construction where two centrally disposed terminals are employed. On a four-terminal basis, where energy is fed into one end and out the other end of the filter, the device 2 acts as a non-resonant attenuator having the unusual properties before described, whereas the conventional two-terminal electrolytic condenser in which energy is merely applied to one electrode and extracted from the other electrode, behaves merely as a capacitor.

The filter 2 of Fig. 8 may be rolled up in the same manner as are conventional electrolytic condensers encased by an outer covering such as, for example, a plastic or paper cover 43, or for that matter, a conductive can. In Fig. 9, the filter is shown almost completely rolled up with the covering 43, and connected to a conventional full-wave power supply. The power-supply system is, of course, only one of a large number of applications for such an attenuator, but it serves as an important illustrative example. A full-wave vacuum rectifier tube 45 may be energized with alternating-current energy from the step-up secondary of a transformer 47, a further secondary winding 49 of which may supply filament current to the rectifier tube 45. A low-frequency R-C filter is shown provided with the condenser C connected between intermediate taps of the step-up secondary and filament-supply secondary windings so that a full-wave rectified direct-current voltage will be produced thereacross. By the expedient of connecting the input terminals 11 and 13 of the filter 2 to the two output terminals of the low-frequency R-C filter, the direct-current energy will appear at the output terminals 15 and 17, and the power supply will be filtered not only of very low-frequency signals, but also of a broad band of high-frequency energy. The partial covering or circumscribing of the outer electrode 1 about the inner electrode 1 does not, of course, prevent all radiation effects from the filter 2, but by careful construction and rolling, the filter 2 may still serve as an effective attenuator.

While the coaxial cylindrical electrode structure of Fig. 1 has been illustrated as applied to a motor that generates high-frequency noise, it is to be understood that the planar-electrode construction of the filter of Figs. 8 and 9 may equally well be so employed. Similarly, while the application of the plane-electrode filter of Fig. 8 to a power supply has been illustrated in Fig. 9, the coaxial-electrode filter of Fig. 1 may also be employed with a power supply, as illustrated in Fig. 10. The power supply comprises a transformer 77 into which alternating-current energy is fed, a half-wave rectifier 75 for rectifying the alternating current, and a pi-type, resistance-capacitance low-frequency filter 79, 81, 83. To the output terminals of the condenser 79 of the pi-type filter, the output terminals 15 and 17 of the coaxial electrode filter 2 of Fig. 1 are shown connected. The input terminals 11 and 13 of the filter 2 are respectively connected to a ground terminal that may comprise a grounded shield box, schematically represented at 87, and the screen load 73 of a tuned-plate, tuned-grid high-frequency oscillator or amplifier. The oscillator or amplifier is shown comprising a vacuum tube 61 having a plate 71, a screen grid 89, a control grid 69 and a cathode 59. Between the grid 69 and the cathode 59 is connected a tuned circuit 62, and between the plate 71 and the positive terminal, marked +, of the power supply, is connected a cooperating tuned circuit 64 from the upper terminal of which output voltage is fed to any desired point. The screen grid 89 and the upper terminal of the tuned circuit 64 are connected to the dropping resistor 73 that, as before mentioned, connects with the input terminal 13 of the filter 2. High-frequency oscillations produced by this circuit are thus not only kept out of the power supply by the filter 2, but also from being radiated throughout space by the power supply.

The cathode 59 of the oscillator or amplifier tube 61 is shown connected through a cathode load 65 to ground, and the load 65 is shown by-passed by a coaxial-electrode, two-terminal filter 55. This filter 55 is constructed in precisely the same manner as the filter 2, having a preferably film-formed inner electrode 51, an electrolytic or other conducting or ionized medium 57 and an outer electrode 53. End seals, not shown, may also be employed as discussed in connection with Fig. 2. At one end, shown as the left-hand end of the filter 55, two terminals 63 and 67 are provided, respectively connected to the cathode 59 and ground. It is desirable that the terminals 63 and 67 be adjacent one another to maintain symmetrical displacement currents, thereby to cancel out or reduce inductive effects. It has been found that short lengths of such coaxial devices possess the very desirable and unusual property that, when used on a two-terminal basis, as illustrated, they offer lower impedance and lower reactance over a very much larger portion of the radio-frequency spectrum than conventional dielectric capacitors. Whereas conventional capacitors, such as those discussed, for example, in my prior Patent No. 2,355,788, issued on August 15, 1944, show resonance effects at relatively low radio frequencies and, above about ten megacycles, start to become inductive, the coaxial construction of the present invention has been found to produce unusually wide-band capacitive performance. For a filter 55 having an aluminum film-formed inner electrode 51 of about 0.320 inch in diameter, an outer electrode 53 of inner diameter about 0.330 inch, an electrolytic medium 57 of the character before described, and a short overall length of about 1⅝ inches, for example, it was found that frequencies ranging from 50 kilocycles up to over 160 megacycles could be fed to the terminals 63 and 67 without resonance effects, and with low impedance and low reactance. It is believed that this result has never before been attained with the use of any single-capacitor structure. In Table II, below, the reactance and resistance of the particular filter 55, above described, are tabulated for various frequencies.

TABLE II

*Resistance and reactance of two-terminal coaxial electrolytic filter for wide band of frequencies*

| Frequency (Megacycles per Second) | Magnitude of Reactance (Ohms) | Resistance (Ohms) |
| --- | --- | --- |
| 0.05 | 4.0 | 17.0 |
| 0.10 | 3.0 | 16.5 |
| 0.5 | 3.0 | 16.5 |
| 1.0 | 3.0 | 16.0 |
| 3.0 | 5.0 | 12.5 |
| 10.0 | 4.2 | 7.2 |
| 30 | 4.0 | 4.1 |
| 50 | 3.1 | 2.6 |
| 74 | 2.2 | 1.9 |
| 90 | 1.2 | 1.5 |
| 120 | 1.1 | 1.0 |
| 140 | 0.9 | 1.0 |
| 160 | 0.6 | 1.0 |

If the diameters of the inner and outer electrodes 51 and 53 are increased, while the overall length of the filter 55 and the separation of the inner and outer electrodes remain constant, a lower impedance will result over the complete frequency band tabulated in Table II. Conversely, for inner and outer electrodes of smaller diameter, a somewhat higher impedance will be produced. If the spacing between the inner and outer electrodes is increased or decreased, so that thicker or thinner electrolytic media 57 are employed, the resistance of the filter will respectively increase and decrease. As in the case of the four-terminal filter 2, it is highly desirable that this spacing approach unity in the filter 55, though for the different reason of providing low resistance.

Not only may the two-terminal coaxial filter of Fig. 10 be employed for a cathode by-pass device, as above explained, moreover, but also it may similarly be employed in any application where high radio frequencies or wide bands of frequencies are to be employed. With the aid of the filter 55, moreover, the dielectric constant of thin electrolytic films may for the first time be measured without resort to thickness measurements. If, for example, energy of a particular frequency is fed into the terminals 63, 67 with the other ends of the electrodes 51 and 53 open-circuited, as shown in Fig. 10, the open-circuited impedance of the filter 55 may be measured as presented in Table II. By short-circuiting the right-hand ends of the electrodes 51 and 53, thereby using the filter 55 on a four-terminal basis, the short-circuited impedance of the filter 55 may also be obtained. The same procedure may then be followed for an ordinary section of coaxial air-filled transmission line of the same dimensions, or the short and open-circuited impedances for an air-filled line may be calculated or obtained from tables. From this data, it is well known that the attenuation and phase constants of the electrolytic and air-filled devices may be calculated. Since the dielectric constant of the electrolytic film 57 is equal to the square of the ratio of the determined phase constant of the filter 55 and of the air-filled line, it may thus be quickly determined.

As another illustration, the four-terminal filter 2 of the present invention may be applied to an automobile or other vehicular vibrator power supply as shown in Fig. 14. The automobile or other generator G charges the storage battery 19 through an ammeter A, the positive terminal of the battery being connected to the inner conductor input terminal 13 of the filter 2, and the grounded negative terminal being connected through ground to the outer conductor input terminal 11 of the filter 2. The outer conductor output terminal 17 is connected through a relay coil 121 to one terminal, shown as the left-hand terminal, of the primary winding 113 of a vibrator power-supply transformer 47. Also connected to the left-hand terminal of the winding 113 is a contactor 115, and to the right-hand terminal of the winding 113 is connected a further contactor 117. A weighted vibrator arm 119 is electrically connected to the filter outer conductor output terminal 17 and the inner conductor output terminal 15 connects with an intermediate point, shown as the center tap, of the primary winding 113. Current from the storage battery 19 thus flows from the positive battery terminal through the inner conductor of the filter 2, the left-hand portion of the center-tapped primary winding 113, the relay 121 and the outer filter conductor 5 back to the grounded negative battery terminal. The center tap terminal of the winding 113 is thus made positive in voltage with respect to the left-hand terminal of the winding. The energized vibrator relay coil 121, however, attracts the movable arm 119 into contact with the contactor 115, thereby shorting the relay and causing the arm 119 then to become released to vibrate into contact with the contactor 117. A voltage through the right-hand portion of the center-tapped primary winding 113 is thus applied, with the center tap becoming positive with respect to the right-hand terminal of the winding. An alternating voltage is thus induced in the secondary windings of the transformer 47. This may be rectified in the full-wave rectifier tube 45 the heaters of which are supplied with voltage from the heater winding 49, as discussed in connection with Fig. 9. Direct-current voltage is thus available across the storage condenser C for application to the automobile radio or other electrical equipment.

The connection of the filter 2 in the lead from the storage battery 19 will provide for the elimination of the noise frequencies generated by the vibrator power supply from the battery leads. Interference with the automobile radio and other equipment is thus obviated. It is to be understood, of course, that the filter 2 may also be employed with any other type of vibrator power supply, and also in the electronic power supply 45, 47, etc., as discussed in connection with the system of Fig. 9, or at any other desired location in the automobile electrical system.

It may be desired, for some applications of the present invention, to employ a single terminal for one of the sets of input and output terminals of the filter 2. To this end, the outer conductor 5 is preferably maintained at ground potential and the outer conductor input and output terminals 11 and 17 may be combined at preferably the substantially centrally disposed region of the conductor 5, as illustrated in Fig. 15. The source of radio frequencies to be filtered is therein shown as the motor 9 and the system is energized by the direct-current source 19.

While only a single inner electrode 1 has been treated in the preceding discussion, moreover, it is to be understood that a plurality of such electrodes may be employed. In the illustrative embodiment of Fig. 16, for example, three inner electrodes 1, 1' and 1'', provided with dielectric films 3, 3' and 3'', are shown supported by insulating end seals 4 within an electrolytic medium 7 which may comprise a liquid electrolyte, contained within the outer conductor 5. The filter 2 may, as an example, be employed for filtering out radio frequencies resulting from the operation of a three-phase motor 9 and fed to the input terminals 13, 13' and 13'' of the respective inner electrodes 1, 1' and 1''. The outer conductor 5 may then be maintained at a reference potential such as ground, not shown. Direct-current energizing voltages between the electrodes 1, 1' and 1'' at the output terminals 15, 15' and 15'' may be supplied from the generator 19. For purposes of electrical and mechanical symmetry, the conductors 1, 1' and 1'' are preferably disposed symmetrically within the outer conductor 5, equidistant from each other and from the adjacent portions of the inner surface of the outer conductor 5. Though three inner electrodes have been illustrated, a pair of inner electrodes or a number in excess of three may, of course, also be employed as for filtering a plurality of lines carrying undesired alternating-current energy or noise.

As previously stated, it is not essential, though for many applications it is deemed preferable, that the medium disposed between the filter electrodes comprise an electrolyte. Any ionized conductive medium may be employed. In Fig. 12, for example, a gaseous medium 6, such as a rare gas or mercury vapor, is employed between the oxide or other dielectric layer 3, shown disposed on the inner electrode 1, and the outer electrode 5 of a four-terminal coaxial electrode filter. Neon, argon, zenon and other rare gases are deemed preferable since they are inert and will not react with the oxide or other dielectric layer upon the electrode 1. The oxide or other dielectric layer 3 may, of course, be disposed on the inner surface of the outer electrode, as before discussed.

The ends of the filter may be sealed as by glass-to-metal seals 8, and the gas may be introduced under any desired pressure into the region between the inner and outer electrodes through an inlet 10 that may then be also sealed, as by a plug 12. Since it is necessary that the gas be continuously ionized in order that it may be conductive, and since the intensity of the high-frequency energy fed to the input terminals 13 and 11 of the filter from, for example, the motor 9, or the voltage of the battery 19 connected between the output terminals 15 and 17, may not be sufficient to ionize the gas, a striking electrode 16 may be employed within the medium 6. A preferably variable battery 14 is shown providing continuous ionizing voltage between the outer electrode 5 and the striking electrode 16 by way of a conductor 18 that may be passed through the seal 12 in any conventional air-tight manner. Alternating or pulsating striking voltages may also, of course, be employed. The ends of the electrode 1 are shown tapered and provided with extensions that are similarly passed through the end seals 8 to form the inner-conductor input and output terminals 13 and 15. While the embodiment of Fig. 12 has been illustrated as a coaxial-electrode four-terminal filter, the gaseous medium may, of course, be employed between planar electrodes or electrodes of other configurations and may also be employed in a two-terminal filter such as the coaxial-electrode type discussed in connection with Fig. 10.

One of the decided advantages of an ionized gaseous medium 6 is that the filter may be operated at very high temperatures in the region of the boiling point of electrolytic media. Another advantage is that the degree of ionization, and hence the temperature and conductivity of the medium 6, may be easily varied as by adjusting the value of the source 14. This variation produces corresponding variations in the attenuating properties of the filter as will later be explained. Similarly the pressure of the gaseous medium may be varied to vary the filter attenuation characteristics as with the aid of any well-known pump, not shown, such as a McCleod guage, connected to the outlet or inlet 12.

It has been discovered that the attenuating properties of the filters of the present invention, even after their construction and assembly, may be controlled and varied by several techniques. Referring to Fig. 11, the experimentally obtained attenuation characteristics as a function of frequency of a four-terminal filter of the type illustrated in Fig. 1, having a ratio $d_1/d_2$ of about 1.25 and an electrode separation $d_1-d_2$ of about fourteen thousandths of an inch, are plotted in curve F. The measurements presented in Fig. 11 were taken with about a twenty-ohm generator impedance so that both the low and high-frequency attenuation is greater than that indicated in Fig. 7. The performance presented in curve F, however, is the filter performance at room temperature of about 80 degrees Fahrenheit. Curves K, G and J illustrate the markedly increased attenuation characteristics that have been found to be obtainable by heating the filter to various temperatures above room temperature up to about 165 degrees Fahrenheit. Conversely, it has also been discovered that cooling the filter decreases its effectiveness as an attenuator. In curves H and I, for example, the attenuation characteristics of the filter at −20 and −40 degrees centigrade, respectively, are plotted.

This phenomenon may, perhaps, be explained on the basis of variation in the conductivity of the electrolytic medium. Similar results, indeed, may be obtained by thinning or increasing the ionized salt concentration of the electrolytic medium, as hereinafter discussed in connection with the embodiments of Figs. 17 and 18, thereby to vary its conductive properties. Thinning or increasing the thickness of the electrolytic medium will also produce somewhat similar results, as later discussed. These techniques, however, may not always be so convenient as the temperature-controlling method.

An apparatus for effecting the heating or cooling of the filter or for maintaining the filter at any desired predetermined temperature in order to obtain predetermined attenuation characteristics, is illustrated in Fig. 13. The filter 2 of Fig. 1 is therein shown disposed in a vessel or container 91 that may be of any desired type, though it is preferably of conductive material. The input terminals 11, 13 of the filter 2 extend outside the vessel through a seal, not shown, in the wall of the vessel 91, and are connected to the motor 9 before discussed in connection with Fig. 1. Any other low or high-frequency source may, of course, similarly be applied to the filter. The output terminals 15, 17 are similarly illustrated extending through a seal, not shown, in the vessel 91 and connected to the energy source 19. The end of the filter at the output terminals is shown stripped, as in Fig. 1, to illustrate the oxide or other dielectric layer 3 and the conducting medium 7 such as an electrolyte. A temperature-responsive medium is provided in the container 91, fed into the container from an inlet 95 and out of the container from an outlet 93, or vice versa. This medium may be water or any other desired liquid or gas, including refrigerants, as is well known in the art. A bimetal strip 103 is shown provided in a temperature-responsive housing within the container 91, adapted, at predetermined temperatures, to occupy the center position illustrated, or to become bent into contact with either the contactor 105 or the contactor 101 in response to temperature changes in the medium within the vessel 91, as is also well known in the art. The contactor 105 is connected to one end of a heater strip 107 in the medium within the container 91, and the other end of the heater strip is connected to the preferably conductive bottom wall of the container. When the temperature of the medium within the container in which the filter 2 is immersed cools to a temperature below a desired predetermined temperature at which the filter has particular attenuation characteristics, say 160 degrees Fahrenheit, the bimetal strip 103 contacts the contactor 105 completing the circuit from the strip 103 to the positive terminal of the source 19, through the source to the terminal 17 of the filter, along the outer conductor 5 to a bond 109 to the container, and from the container through the heater strip 107 to the contactor 105, thereby heating the heater strip 107 and heating the medium and filter within the container 91. Similarly, if the medium and filter within the container get too hot, the strip 103 will bend into contact with the contactor 101 causing current to flow in a relay coil 97 in the circuit traceable from the bimetal strip 103 to the positive terminal of the source 19, through the source 19 to the filter terminal 17, along the outer conductor 5 through the bond 109 to the container wall, from the container wall to the inlet or outlet 95, along a conductor 96 to one terminal of the relay coil 97, and from the other terminal of the relay coil 97 to the contactor 101. A valve 99 operated by a plunger 98 controlled by the relay coil 97 may then be actuated to its open position, shown, to pass the cooling fluid or other medium through the container 91.

The circuit of Fig. 13 is thus adapted to maintain substantially constant the temperature of the medium within the container 91 and thus to maintain the temperature of the filter 2 and hence the conductivity of its electrolytic medium 7 substantially constant, insuring substantially constant attenuation characteristics. Since, in normal operation, particularly for high voltages, the filter 2 may get hot, the system of Fig. 13 is deemed desirable for very accurate performance. While, moreover, the container 91 has been described as conductive, it may comprise any sealed vessel such as a glass envelope, with the necessary leads passed through the container walls. Though the outer conductor of the filter 2 serves as an excellent shield, moreover, if the container 91 is conductive, as of metal, it may further serve as a second electrostatic shield.

There are, however, some electrolytes that are adapted to be operated over a wide temperature range. Sulphuric acid in water, for example, or strong alkali hydroxides in water are such, having low conductivity at low temperatures and increased conductivity at high temperatures. With such electrolytes it is necessary to employ film-forming electrodes such as tantalum in order to avoid chemical reactions with the electrodes. Even with filters employing such electrolytes, however, it may be desirable, for accurate results, ot employ the temperature-controlling features above described.

The invention is not, of course, limited to constant temperature operation. It may be desired continuously to heat or to cool the filter 2 in order correspondingly continuously to increase or to decrease its attenuation characteristics, respectively. All that is necessary for such operation, of course, is permanently to contact the element 103 with either the contactor 105 or the contactor 101. While these temperature-variation systems have been described in connection with the particular filter of Fig. 1, furthermore, it is to be understood that they may equally well be applied to any of the other embodiments of the present invention.

A system for varying, under controlled conditions, the attenuating properties of the filter 2, not by varying the temperature of the filter, but, rather, either by changing the length of the filter or by changing the conductivity of the conducting medium 7, is shown in Fig. 17. The filter is made in two sections with the left-hand section having an outer conductor 5 that is of slightly greater diameter than, and thus fits tightly over, the right-hand outer conductor section 5. The left-hand section 1 of the inner conductor is also of slightly greater diameter than, and thus tightly fitting over, the right-hand inner conductor section 1. The outer surface of the inner conductor may be provided with the oxide or other dielectric layer 3. A liquid electrolyte may serve as the medium 7, fed from storage tanks 135 and 137 through the respective stopcocks or valves 139 and 141. A drainage valve 143 may also be provided for reasons that will subsequently be explained. The left-hand sections of the outer and inner conductors may be resiliently sprung as at 123 and 125 and provided with sealing rings 127 to establish liquid-tight and electrical contact with the respective right-hand conductor sections.

Integral with or attached to the outer conductor sections 5 are arms 129 for receiving a screw 131 that may be operated by a handwheel 133. Rotation of the handwheel 133 clockwise, for example, will cause the right- and left-hand inner and outer conductor sections respectively to move away from each other, thereby lengthening the filter and increasing the filter attenuation characteristics, as before discussed. Counter-clockwise rotation, on the other hand, will cause the inner and outer conductor sections to approach each other, shortening the filter and thus decreasing its attenuating characteristics. The screw 131 or handwheel 133 may be provided with calibrations, not shown, to indicate desired filter lengths or attenuating properties.

In order to insure uniform concentration and quantity of electrolyte during the lengthening or shortening process, thereby to keep the medium 7 of constant thickness and of uniform properties, the valve 141 may be kept open so that more electrolyte may flow under the influence of gravity into the region between the electrodes 1 and 5 when the filter is lengthened, and electrolyte from the region between the electrodes 1 and 5 may be pushed back up into the tank 137 when the filter is shortened.

The cover 149 of the storage tank 137, furthermore, under, for example, the influence of weights, not shown, may bear down upon the gaseous space 151 above the electrolyte 7 or directly upon the upper surface of the electrolyte 7, as is well known, to establish any desired pressure upon the electrolytic medium 7, thereby also to vary the attenuation properties of the filter by variation in pressure. Pressure variations may also be effected by closing the valve 141, opening the valve 143, and applying compressed air of any predetermined pressures to the valve 143 through the pipe 153.

If it is desired, however, to vary the attenuation characteristics of the filter by varying the conductivity of the medium 7, a diluent or a more concentrated electrolyte may be fed into the filter in any desired amounts from the storage tank 137. If, as an illustration, it is desired to decrease the filter attenuation characteristics a predetermined amount by decreasing the concentration of the electrolyte 7, the valve 141 may be closed, and a predetermined quantity of electrolyte drained from the valve 143. The proper amount of diluent may then be injected into the region between the electrodes 1 and 5 from the storage tank 135 by opening the valve 139. In a similar manner, more concentrated electrolyte may be added from the tank 135 to increase the attenuation characteristics any desired amount.

As before stated, however, the attenuation characteristics of the filter may be varied not only by varying the length of the filter as in the system of Fig. 17, but also by varying the spacing between the inner and outer electrodes. A system for performing this operation is illustrated in Fig. 18 embodying conically shaped inner and outer electrodes 1 and 5 containing between them a liquid electrolyte or other conducting medium 7 fed from a storage tank 135. The inner electrode 1 is supported by a shaft 131 in sealed gaskets 145 that, if made of conducting material, may be hermetically sealed and insulated from the electrodes 1 and 5 by rubber or other insulator rings 4. The right-hand end of the shaft 131 is threaded within an arm 147 integral with the gasket or seal 145. Clockwise rotation of the handwheel 133 secured to the threaded shaft 131 will drive the conical inner electrode 1 to the left within the conical outer electrode 5, thereby reducing the spacing between the inner and outer electrodes and increasing the attenuation characteristics of the filter 2, as before explained. If the handwheel is rotated counter clockwise, however, the conical inner conductor will be moved to the right within the outer conductor 5 increasing the spacing between the electrodes and hence decreasing the filter attenuation characteristics. The screw 131 or handwheel 133 may, of course, be calibrated to permit the selection of filter attenuation characteristics of predetermined values. The storage tank 135 permits more electrolyte to fill the space between the inner and outer electrodes when the spacing therebetween is increased and offers a reservoir for receiving electrolyte pushed upward therein when the electrode spacing is decreased. The pressure, concentration and conductivity variations described in connection with the system of Fig. 17, furthermore, may also be applied to the filter of Fig. 18.

Further modifications will occur to those skilled in the art, and all such are considered to fall within the spirit and scope of the present invention as defined in the appended claims.

What is claimed is:

1. In a system of the type described, a line for transmitting power currents and attenuating high frequency currents comprising two co-extensive elongated conducting electrodes each having the ends of its axis of elongation respectively disposed adjacent to the corresponding ends of the other electrode and each having a surface extending between its two ends and disposed opposite to a surface of the other electrode, the said surface of one of the electrodes being provided with an electrolytically formed film of oxide of the material of said one electrode, a conducting medium comprising a substance having free ions therein disposed between the oppositely disposed electrode surfaces with one of its surfaces in contact with the oxide film and its other surface in contact with the said surface of the other electrode, two of the adjacently disposed ends of the electrodes being respectively provided each with an input terminal to provide a pair of adjacent input terminals for connection to a source of high-frequency currents to be attenuated, and the other two adjacently disposed ends being respectively provided each with an output terminal to provide a pair of adjacent output terminals for connection to a load device, the only direct conductive connections between corresponding input and output terminals being the electrodes to which they are connected, respectively, in order that at all times high-frequency currents may pass along the oppositely disposed surfaces of the electrodes with the directions of the currents along the opposite surfaces opposing one another and of substantially the same magnitude.

2. A system as claimed in claim 1 and in which the said conducting medium is an electrolyte-impregnated fabric sleeving disposed about said one electrode.

3. A system as claimed in claim 1 and in which the said electrode surfaces and the said conducting medium are flat.

4. A system as claimed in claim 1 and in which the said electrode surfaces and the said conducting medium are curved.

5. A system as claimed in claim 1 and in which the said other electrode circumscribes the said one electrode.

6. A system as claimed in claim 1 and in which the said electrodes are coaxially disposed, one within the other.

7. A system as claimed in claim 6 and in which the order of magnitude of the thickness of the said oxide film together with the conducting medium is within the approximate limits of from substantially tenths of an inch to ten thousandths of an inch.

8. A system as claimed in claim 6 and in which the electrodes are of substantially cylindrical configuration and the ratio of the diameters of the inner surface of the outer electrode and the outer surface of the inner electrode has a value between the approximate limits of from substantially four to substantially unity.

9. A system as claimed in claim 6 and in which the electrodes are coiled to confine the line to a limited space.

10. A system as claimed in claim 1 and in which the said source comprises a generator of a wide band of radio frequencies and the said load device comprises a source of energy.

11. A system as claimed in claim 1 and in which the said electrodes are substantially planar surfaces transversely rolled up so that the said pair of input terminals project from one side, and the said pair of output terminals project from the opposite side.

12. A system as claimed in claim 1 and in which the said conducting medium is a gaseous medium provided with means for ionizing the same.

13. A system as claimed in claim 1 and in which the said surface of the said other electrode is provided with an electrolytically formed film of oxide of the material of said other electrode.

14. A system as claimed in claim 1 and in which means is provided for varying a dimension of the electrodes.

15. A system as claimed in claim 1 and in which means is provided for varying the spacing of the electrodes.

16. A system as claimed in claim 1 and in which means is provided for varying the degree of conductivity of the conducting medium.

17. A system as claimed in claim 1 and in which means is provided for varying the temperature of the system to vary its attenuating properties.

References Cited in the file of this patent

UNITED STATES PATENTS

| | | |
|---|---|---|
| 2,042,283 | Van Arkel et al. | May 26, 1936 |
| 2,066,912 | Ruben | Jan. 5, 1937 |
| 2,087,003 | Miller | July 13, 1937 |
| 2,135,492 | Brennan | Nov. 8, 1938 |
| 2,186,578 | Doughman | Jan. 9, 1940 |
| 2,189,584 | Hollmann | Feb. 6, 1940 |
| 2,238,915 | Peters et al. | Apr. 22, 1941 |
| 2,270,953 | Manz et al. | Jan. 27, 1942 |
| 2,440,652 | Beverly | Apr. 27, 1948 |
| 2,501,677 | Jenks | Mar. 28, 1950 |
| 2,504,178 | Burnham et al. | Apr. 18, 1950 |
| 2,512,945 | Kallmann | June 27, 1950 |
| 2,526,321 | Beverly | Oct. 17, 1950 |
| 2,537,959 | Beverly | Jan. 16, 1951 |
| 2,552,306 | Beverly | May 8, 1951 |
| 2,565,093 | Robinson et al. | Aug. 21, 1951 |

FOREIGN PATENTS

| | | |
|---|---|---|
| 541,380 | Great Britain | Nov. 25, 1941 |
| 564,164 | Great Britain | Sept. 15, 1944 |

OTHER REFERENCES

Mye Technical Manual, Published by P. R. Mallory & Co., Inc., Indianapolis, Ind. (1942), pp. 262–275. (Copy in Scientific Library.)